UNITED STATES PATENT OFFICE.

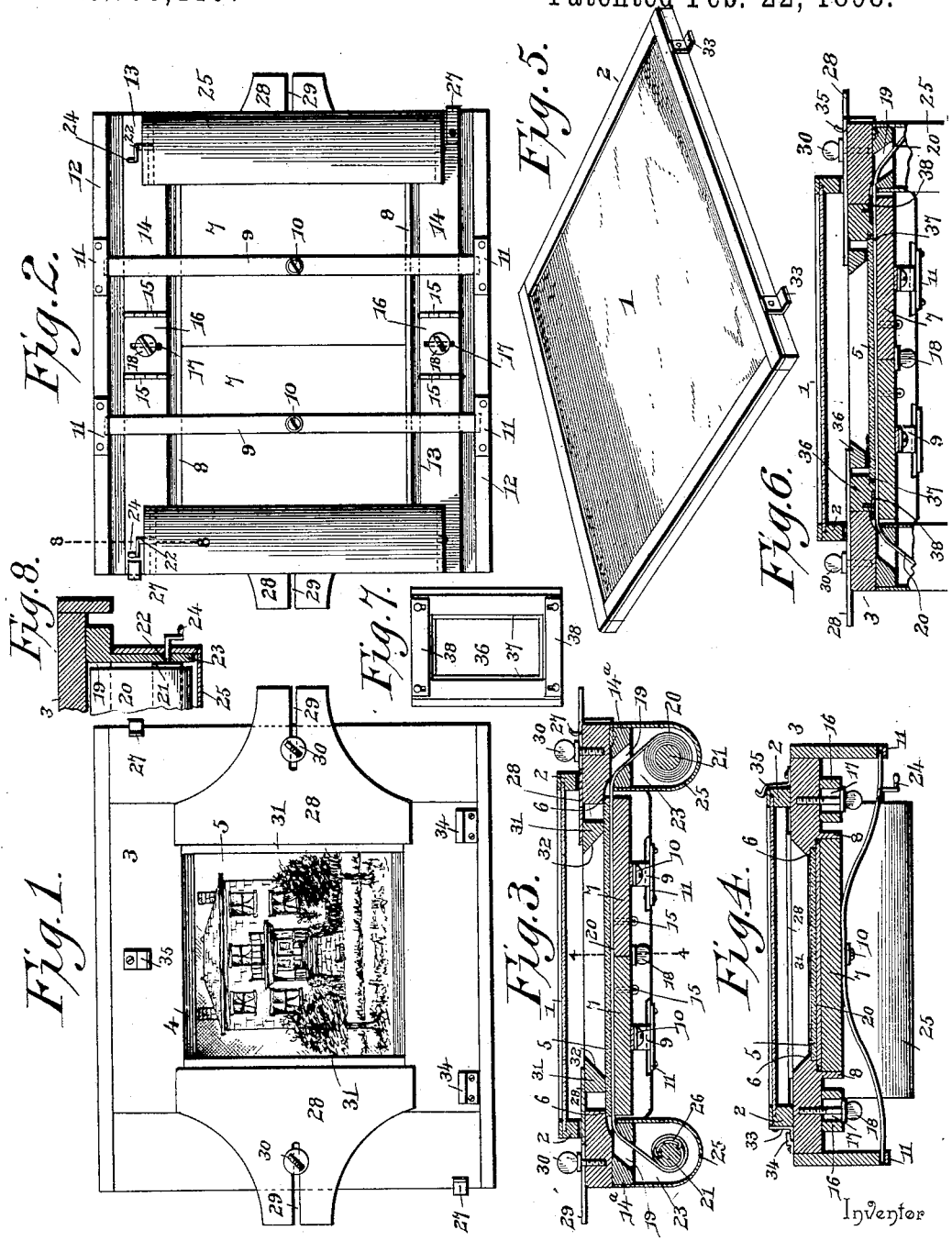

JAMES E. CROOKS, OF MONTEVISTA, COLORADO, ASSIGNOR OF ONE-HALF TO CHRIS. MILLER, OF SAME PLACE.

PHOTOGRAPHIC-PRINTING FRAME.

SPECIFICATION forming part of Letters Patent No. 599,440, dated February 22, 1898.

Application filed December 31, 1896. Serial No. 617,603. (No model.)

*To all whom it may concern:*

Be it known that I, JAMES E. CROOKS, a citizen of the United States, residing at Montevista, in the county of Rio Grande and State of Colorado, have invented a new and useful Photographic-Printing Frame, of which the following is a specification.

This invention relates to photographic-printing frames; and it has for its object to provide a frame of this character especially designed for printing panoramic views from two or more negatives.

To this end the invention contemplates a novel construction of printing-frame having means for holding a continuous sheet of sensitized printing-paper, on which sheet can be printed the images or views of any number of negatives that may be necessary to make up one complete picture or panoramic view, and in the accomplishment of this desirable object the frame also has provision for properly blending the successive portions of the view together, so that the complete view or picture will have every appearance of being a single photograph.

The invention also includes means for the quick and ready handling of the negative and paper and also means for using small sizes of plates or negatives in connection with the frame.

With these and other objects in view, which will readily appear as the nature of the invention is better understood, the same consists in the novel construction, combination, and arrangement of parts hereinafter more fully described, illustrated, and claimed.

In the drawings, Figure 1 is a plan view of the front side of the frame with the ground-glass attachment removed. Fig. 2 is a similar view of the reverse side of the frame. Fig. 3 is a longitudinal sectional view of the frame. Fig. 4 is a transverse sectional view on the line 4 4 of Fig. 3. Fig. 5 is a perspective view of the ground-glass attachment. Fig. 6 is a longitudinal sectional view of the frame, showing the supplemental holder for small negatives fitted in place. Fig. 7 is a small detail plan view of the supplemental negative-holder. Fig. 8 is a detail sectional view on the line 8 8 of Fig. 2.

The photographic negatives that are designed for use in connection with the printing-frame contemplated by this invention are prepared in a certain manner in order that the printing may be accurately effected, and an explanation of the manner of making these negatives should be made, so that the construction and operation of the printing-frame will be clearly understood. In the first place it is understood that all photographic cameras are equipped with a removable ground glass, which ground glass is fitted within its usual frame. This ground glass is used in the camera for focusing the view or object to be photographed, and in carrying out the present invention guiding-lines are marked in pencil or otherwise on the ground glass and extend from the top to the bottom of the frame 2 encircling the glass. These guiding marks or lines are located, respectively, at a distance of about an inch from the opposite side edges of the glass and are intended to serve as guides for insuring the proper lap of the successive negatives. After the first negative is taken of a portion of a panoramic view to be photographed such negative within its holder is removed and the ground glass replaced in the camera. Some object is now noticed that the line near one end of the ground glass crosses, and the camera is then turned until the opposite line crosses the same object. The camera is then operated to take the second picture of the series, and the third, fourth, or other successive portions of the view are photographed in the same way, so as to make a successive series of negatives that are parts of the same view, and the images of all of which negatives lap each other one inch by reason of focusing the different views in connection with the guiding-lines on the ground glass. The negatives thus prepared are successively used in the printing-frame forming the subject-matter of the present invention, and to which frame particular reference will now be made.

Referring particularly to the drawings, the numeral 3 designates the main rectangular print-frame, having formed therein the usual rectangular opening 4, through which opening the negative 5 is exposed to the light in the usual manner, and in the present invention the rectangular frame-opening 4 is surrounded at its inner or reverse edge by an inner peripheral shouldered seat 6, snugly receiving therein the edges of the negative 5, so that the negative will lie flush within the seat. The negative 5 is removably clamped within the seat 6 of the frame 3 by means of a pair of duplicate removable back boards 7, adapted to be arranged side by side at the rear side of the frame 3 and fitting in the space between a pair of oppositely-located parallel retaining-flanges 8, projected from the rear side of the frame at opposite side edges of the opening 4 therein and serving to properly retain the removable back boards 7 in place. Each of the removable back boards 7 carries a bowed clamping-spring 9, pivoted intermediate of its ends, as at 10, to the back board and adapted to have its opposite terminals sprung into engagement with the inner edges of keeper-plates 11 fitted to the rear edges of the frame-cleats 12, projected rearwardly from the opposite longitudinal side edges of the main frame 3. When the removable back boards 7 are in place between the retaining-flanges 8, the bowed clamping-springs 9 serve to clamp the same tightly onto the negative to hold the latter firmly in its seat, and by releasing the clamping-spring 9 of either of the back boards 7 such board can be readily moved for an inspection of the print in a manner that will hereinafter be more fully explained.

At the rear side of the main print-frame 3 is arranged a pair of oppositely-located adjustable roller-carrying frames 13, which frames essentially comprise opposite parallel side arms 14 and a cross-bar 14$^a$, connecting the outer ends of such arms, the inner ends of the side arms 14 of the opposite frames 13 being hinged at 15, respectively, to opposite sides of laterally-adjustable hinge-blocks 16. The laterally-adjustable hinge-blocks 16 are provided with transversely-disposed slots 17, receiving the set-screws 18, passing into the rear side of the frame 3 and serving to secure the blocks 16 adjustably in place centrally between the ends of the frames 3 and in the spaces between the retaining-flanges and cleats 8 and 12 thereof, as clearly illustrated in Fig. 2 of the drawings. The particular manner of mounting the hinge-blocks 16 provides means for the slight adjustment of the roller-carrying frames 15 transversely of the frame 3 at the rear side of the latter for the purpose of shifting the printing-paper to agree with the negative should such adjustment be required, as will be readily apparent.

The cross-bars 14$^a$ at the outer ends of the roller-carrying frames 13 are provided with longitudinally-disposed guide-slots 19, through which passes a continuous sheet or strip of sensitized printing-paper 20, winding and unwinding, respectively, at its opposite ends on the oppositely-located rollers 21. The rollers 21 are journaled at their opposite spindle extremities 22 in the oppositely-located bearing-blocks 23, fitted to the opposite outer corners of the frames 13, and one of the spindle extremities of each roller 21 is formed with a crank-handle 24, whereby the rollers may be readily turned to provide for winding and unwinding the sensitized paper. The cross-bars 14$^a$ of the roller-carrying frames also have fitted thereto arched roller-housings 25, having closed ends and completely inclosing therein the paper-rollers 21 and the bearing-supports 23 therefor. The said rollers 21 are provided with suitable clips 26 for engaging with the end of the paper to be connected therewith, so that the paper may be readily attached and detached whenever required, and at this point it is to be observed that the housings 25 are removable in order that ready access may be had to the rollers for the purpose of removing and attaching the roll of sensitized paper. The swinging and adjustable frames 13 are preferably secured in their closed positions by means of spring-clips 27 fastened thereto and having a spring engagement with the adjacent end of the frame 3, the disengagement of the clips 27 from the frame 3 permitting either or both of the frames 13 to be swung outward from the rear side of the frame when the negative is being inserted in place or removed or when it is desired to inspect the print.

At the front side of the frame 3 is arranged a pair of oppositely-located adjustable shade-plates 28, provided with longitudinally-disposed slots 29, receiving set-screws 30, working into the front side of the frame 3 to provide for adjustably securing the said plates 28 in their set positions. The inner edges of the shade-plates 28 are of a length equaling the width of the frame-opening 4, and to said inner edges of the shade-plates are fitted blender-strips 31, registering within the opening 4 and extending transversely across such opening, said strips 31 being provided with inwardly-beveled or undercut edges 32, which provide for the proper shading of the opposite ends of the negatives in connection with the ground glass 1, which is adapted to be detachably fitted to the front side of the frame 3 over the shade plates 28 and their blender-strips 31, said ground glass diffusing the light and serving to prevent abrupt vignetting.

To provide for detachably clamping the ground-glass frame onto the front side of the print-frame, the frame 2 of the ground glass is provided at one side with a pair of catch projections 33, adapted to detachably engage beneath a pair of keeper-plates 34, fitted to the front side of the frame 3 at one side of its opening 4, and at the directly-opposite sides of said opening 4 a spring-catch arm 35 is secured to the front side of the frame 3 and engages with one side of the frame 2 to hold the projections 33 interlocked with the keeper-plates 34, whereby the ground glass will be detachably held in place.

In using the printing-frame the sensitized paper 20, which passes through the slots 19 of the frames 13, is arranged on the negative between the retaining-flanges 8 and is clamped firmly onto the negative by means of the back boards 7, as will be readily understood, and whenever it is necessary to inspect the printing one of the back boards 7 is removed and one of the frames 13 swung outward from the frame 3 to expose the printing, and at this point it will be observed that by reason of disposing the hinges 15 of the frames 13 at one side of the transverse center of the frame 3 the sensitized paper will slacken up or loosen when either of the frames 13 is thrown open, thereby obviating the possibility of tearing the paper. When the negative and printing-paper have been properly clamped in place, the blender-strips 31 are adjusted to a position about one inch from each end of the negative, so that the adjustment of said blender-strips over the ends of the negative will correspond with the lap of the negatives, and the inwardly-beveled or undercut edges 32 of the strips 31 cause the diffused light which passes through the ground glass to strike the negative a full inch from the end and fades or vignettes the view toward the ends of the negative. After the first negative of a panoramic view has been printed from in the manner described the back boards are removed and one of the frames 13 swung open, so that No. 1 negative may be removed and the next succeeding or No. 2 negative inserted into place, and after the several parts are clamped together again the exposed portion of the paper is rolled up until the faded portion thereof fits onto the same portion of the image on the end of the No. 2 negative, and by repeating this operation with the successive negatives a complete panoramic view can be made on a single sheet of sensitized paper from a series of negatives. If the proper care is exercised when the printing is commenced on the succeeding negatives, the blenders will protect the first print from light and allow the second print to evenly blend into the first print to insure a continuous unbroken picture.

If it is desired to use a small size of negative in connection with the frame 3, a supplemental negative-holder 36 may be employed. This supplemental negative-holder 36 is rectangular in form and snugly registers within the opening 4 of the frame 3 and is provided at its inner edge with a shouldered seat 37 for the negative. At its opposite inner end edges the holder 36 has fitted thereto sliding catch-plates 38, adapted to be slid outward to engage with the end portions of the negative-seat 6 of the frame 3 to provide for detachably securing the frame 36 in place and prevent its outward displacement when the backs 7 are clamped in position. When the small negative-holder 36 is employed, shorter blender-strips 31 are fitted to the plates 28, so that such blender-strips will lie within the opening of the frame 36 and accomplish the same result as before referred to.

Changes in the form, proportion, and the minor details of construction may be resorted to without departing from the principle or sacrificing any of the advantages of this invention.

Having thus described the invention, what is claimed, and desired to be secured by Letters Patent, is—

1. In a photographic-printing frame, the main rectangular frame provided with a negative-seat, a detachable back for the frame, and a pair of movable roller-carrying frames separate from the main frame and mounted at the rear side of the latter, each of said movable frames carrying a paper-roller and having a catch adapted to detachably engage with the main frame, substantially as set forth.

2. In a photographic-printing frame, the main rectangular frame provided with a negative-seat at the inner edge of its opening, a detachable back for the frame, and a pair of roller-carrying frames hinged respectively at opposite sides of the transverse center of the main frame and each carrying a roller for sensitized paper, substantially as set forth.

3. In a photographic-printing frame, the main rectangular frame, a detachable back for the frame, and a laterally-adjustable frame supported at the rear side of the main frame and carrying oppositely-located paper-rollers, substantially as set forth.

4. In a photographic-printing frame, the main rectangular frame, a detachable back for the main frame, and a pair of laterally-adjustable frames hinged respectively at opposite sides of the center of the main frame and each carrying a paper-roller, substantially as set forth.

5. In a photographic-printing frame, the main rectangular frame provided with a negative-seat at the inner edge of its opening, parallel retaining-flanges at opposite side edges of said opening, and frame-cleats at its longitudinal side edges, oppositely-located keeper-plates fitted to said cleats, a pair of duplicate removable back boards fitting in the space between the retaining-flanges and each having a clamping-spring engaging at its terminals with said keeper-plates, and paper-rollers supported at the rear side of the main frame and at opposite ends thereof, substantially as set forth.

6. In a photographic-printing frame, the main rectangular frame provided with a negative-seat at the inner edge of its opening, a detachable back for the frame, laterally-adjustable hinge-blocks movably clamped to the reverse side of the main frame respectively at opposite sides of the opening therein, a pair of duplicate roller-carrying frames hinged respectively to opposite sides of said laterally-adjustable hinge-blocks, each of said frames being provided at its outer end with a spring-catch and with a cross-bar having a longitudinal guide-slot therein, bearing-blocks fitted to the opposite outer corners of the roller-carrying frame, rollers having their spindle extremities journaled in said bearing-blocks, and housings removably fitted to the roller-carrying frames and inclosing therein the paper-rollers and the bearing-supports therefor, substantially as set forth.

7. In a photographic-printing frame, the main rectangular frame having an opening therein, a pair of oppositely-located plates adjustably fitted to the front side of the frame and carrying at their inner edges straight blender-strips lying directly within the opening of the frame and extending from side to side thereof, a ground glass arranged on the front side of the frame over the plates and strips carried thereby and fastening means for detachably clamping the ground glass to the frame, substantially as set forth.

8. In a photographic-printing frame, the main rectangular frame having an opening therein, a pair of oppositely-located shade-plates adjustably fitted to the front side of the frame at the ends thereof and carrying at their inner edges straight blender-strips registering within and extending from side to side of the opening at the ends thereof, said blender-strips being provided with inwardly-beveled or undercut edges, substantially as set forth.

In testimony that I claim the foregoing as my own I have hereto affixed my signature in the presence of two witnesses.

JAMES E. CROOKS.

Witnesses:
W. C. SANFORD,
W. B. DEWIC.